United States Patent [19]

Szczepanek et al.

[11] Patent Number: 5,715,419
[45] Date of Patent: Feb. 3, 1998

[54] DATA COMMUNICATIONS SYSTEM WITH ADDRESS REMAPPING FOR EXPANDED EXTERNAL MEMORY ACCESS

[75] Inventors: Andre Szczepanek; Keith Balmer; Philip John Moyse, all of Bedford, England; Denis Roland Beaudoin, Houston, Tex.

[73] Assignee: Texas Instruments Incorporated, Dallas, Tex.

[21] Appl. No.: 446,019

[22] Filed: Dec. 5, 1989

[51] Int. Cl.$^6$ .................................................. G06F 9/30
[52] U.S. Cl. ............................... 395/421.02; 395/405
[58] Field of Search ..................... 364/200 MS File, 364/900 MS File; 395/421.02

[56] References Cited

U.S. PATENT DOCUMENTS

| | | | |
|---|---|---|---|
| 4,206,503 | 6/1980 | Woods et al. | 395/421.02 |
| 4,280,176 | 7/1981 | Tan | 364/200 |
| 4,368,515 | 1/1983 | Nielsen | 395/425 |
| 4,432,067 | 2/1984 | Nielsen | 364/410 |
| 4,485,457 | 11/1984 | Balaska et al. | 395/425 |
| 4,922,451 | 5/1990 | Lo et al. | 364/900 |
| 4,926,322 | 5/1990 | Stimac et al. | 395/500 |
| 4,980,822 | 12/1990 | Brantley, Jr. et al. | 364/200 |

Primary Examiner—Kevin A. Kriess
Assistant Examiner—John Q. Chavis
Attorney, Agent, or Firm—Richard L. Donaldson; William B. Kempler

[57] ABSTRACT

A data communications system memory interface circuit (32) is provided which operates within an adapter circuit (10). Adapter circuit (10) comprises a communications processor (28), a system interface (30) and a protocol handler (20) coupled together by an adapter bus (26). Communications processor (28) accesses an external memory (38) through a memory interface (32). Memory interface (32) comprises a map register circuit (36) which comprises a number of map registers (44 through 56). The map registers (44 through 56) each are operable to store a portion of a twenty bit address which may be selected by a multiplexer (42) responsive to control signals generated by a control logic circuit (40). The address portion stored in the map registers (44 through 56) are added to a remaining portion of an address to form a complete twenty bit remapped address. In this manner, communications processor (28), using a sixteen bit internal address bus, can access a twenty bit addressable memory space within external memory (38). System interface (30) comprises an address register circuit (34) which allows for the accessing of arbitrary twenty bit addresses or the accessing of addresses using page address numbers and offset values. The protocol handler (20) comprises a page address register (24) which allows for the accessing of external memory (38) on one kilobyte page boundaries.

26 Claims, 4 Drawing Sheets

DATA COMMUNICATIONS SYSTEM WITH ADDRESS REMAPPING FOR EXPANDED EXTERNAL MEMORY ACCESS

TECHNICAL FIELD OF THE INVENTION

This invention relates in general to the field of integrated electronic devices and more particularly to an improved data communications system and method for operating the same.

BACKGROUND OF THE INVENTION

A common method currently in use to connect individual computers into a network system uses the IEEE 802.5 standard. In order to implement this standard, communication adapter systems such as the TMS380 chip set manufactured by Texas Instruments have been developed. These systems use a token passing access technology compatible with the IEEE 802.5 standard. The TMS380 chip set provides a connection to a token ring network using twisted-pair wire or fiberoptic media. The integrated local area network adapter architecture insures connectivity to a token ring network by providing all the functions needed to connect an attaching product's host systems bus to the physical media.

A communications adapter architecture based on the sixteen bit address and data spaces has proved to be a sufficient method of implementing the lower protocol layers of the Open Systems Interconnection model (OSI). OSI is a conceptional network structure defined by the International Organization for Standardization. However, the amount of address space of an adapter architecture will limit the amount of protocol code available and the amount of state table storage available resulting in an overall limit to the functionality of the architecture.

Although a limited adapter address space is primarily a limitation on the size of communications programs and state tables, increasing the adapter address space can also benefit overall adapter performance. A large adapter address space coupled with the use of DRAM cells for local memory would allow the adapter to simplify memory management and, hence, increase overall adapter performance. Additionally, an increased data address space allows for larger data storage which reduces the probability of adapter congestion.

A communications adapter such as the TMS380 chip set may comprise an interactive combination of a number of components. One potential component is a protocol handler responsible for implementing the lowest physical layers of the communications protocol. A second potential component is a communications processor operable to implement the higher levels of the protocol, and responsible for the overall control of the communications adapter system. A third potential component of the communications adapter system is local memory for frame storage, CPU program storage and general workspace. A fourth component of the system is a host system interface to allow communication with the user. Any expansion of the address space must necessarily provide for the efficient access of the increased memory space by all these various components and preferably provide for a consistent method of memory access by the various components. Accordingly, a further need has arisen for a communication adapter system with an expanded address space which allows for efficient communication between the various components of the communications adapter system.

SUMMARY OF THE INVENTION

In accordance with the present invention, a data communications system is provided which substantially eliminates or reduces disadvantages and problems associated with prior data communications systems. More specifically, the present invention provides for a data communications system which comprises a memory interface circuit. The memory interface circuit comprises a plurality of register circuits which are each operable to store an address prefix. The address prefixes do not all contain the same number of bits. The memory interface circuit further comprises control circuitry which generates a control signal responsive to an address value input into the control circuitry. The memory circuit further comprises multiplexing circuitry which receives the control signal and selects one of the address prefixes responsive to the control signal. The multiplexing circuitry is further operable to replace a number of the bits of the address value with an equal number of bits of the selected address prefixes and to append the remaining bits of the selected address prefix to generate a remapped address value.

An important technical advantage of the data communications system of the present invention inheres in the fact that the use of the register circuits allows for the access to an external memory circuit through a number of memory windows of varying sizes. This use of various sizes of memory windows allows for the efficient remapping of an address value into a larger external memory space. Another important technical advantage of the present invention inheres in the fact that various components of the data communications system are configured so that they can communicate with one another and access the external memory using a predetermined size address prefix defined as a buffer address prefix. A buffer address prefix defines a page of memory locations. In this manner, various components of the data communications system can efficiently retrieve data from external memory using a buffer address prefix stored in or generated by a different component of the data communications system.

A further technical advantage of the present invention inheres in the fact that the memory remapping system embodied in the memory interface circuit comprises static components which do not require clock cycles for the memory remapping function. Accordingly, once an address value is generated, the time required for the generation of the remapped address is simply the time required for the signals to propagate through the control circuitry and multiplexing circuitry comprising the memory interface circuit.

BRIEF DESCRIPTION OF THE DRAWINGS

A more complete understanding of the present invention may be acquired by referring to the detailed description and claims when considered in connection with the accompanying drawings, wherein like reference numbers represent like features and wherein:

DETAILED DESCRIPTION OF THE INVENTION

The implementation of the IEEE 802.5. standard for local area networks has resulted in the development of data communications systems such as the TMS380 chip set manufactured by Texas Instruments. Data communications systems of the type characterized by the TMS380 system use a token ring passing algorithm to allow communication between a number of host systems. Communication is established between the host systems via an adapter card installed in each of the host computer systems.

Figure 1:
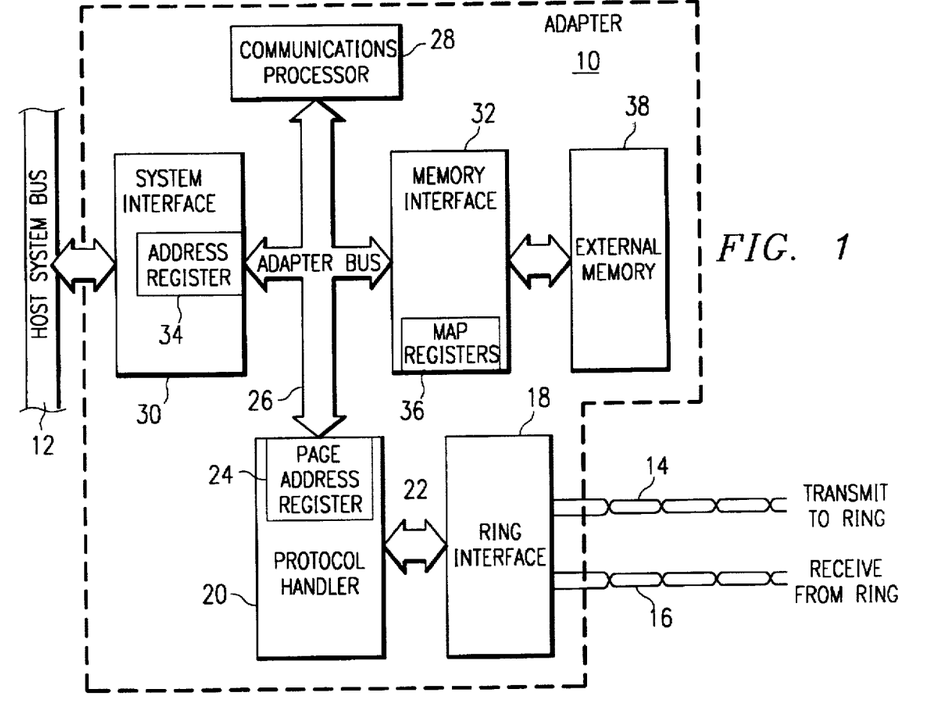
FIG. 1 is a block diagram which illustrates a data communications system constructed according to the teachings of the present invention.

FIG. 1 is a block diagram which illustrates the general layout of a data communications system which generally corresponds with the layout of the TMS380 system, but also includes the improvements of the teachings of the present invention. Referring to FIG. 1, an adapter 10 serves to interface a host system bus 12 with a token ring network (not shown). The communication between the adapter 10 and the token ring network occurs through a transmit path 14 and a receive path 16. The transmit path 14 and the receive path 16 may comprise, for example, conventional twisted pair conductors. The host system bus 12 may comprise the external bus of a personal computer, a mini-computer or a mainframe computer, or any other computer system intended to be coupled to the token ring network via the adapter 10.

The transmit path 14 and receive path 16 are coupled to a ring interface 18. Ring interface 18 is coupled to a protocol handler 20 through a bidirectional bus 22. Protocol handler 22 comprises page address register 24 which will be discussed more completely with reference to FIG. 5.

Protocol handler 20 is coupled to the remaining components of adapter system 10 through an adapter bus 26. The adapter bus 26 couples protocol handler 20 to a communications processor 28. Additionally, the protocol handler 20 and the communications processor 28 are coupled through the adapter bus 26 to a system interface 30 and a memory interface 32.

System interface 30 comprises address register 34 which will be discussed more completely with reference to FIG. 4. The system interface 30 is coupled to the host system bus 12.

The memory interface 32 comprises map registers 36 which will be described more completely with respect to FIGS. 2 and 3. The memory interface 30 is coupled to an external memory 38. External memory 38 may comprise, for example, dynamic random access memory circuits which may provide, for example, two megabytes of data storage.

With the exception of external memory 38, map registers 36, page address register 24 and address register 34, the adapter 10 functions according to the well known operation of a token ring data communications adapter systems such as the TMS380 system. In summary, the adapter system 10 operates to provide communication between the token ring network and the host system. The adapter system 10 receives information from the token ring through receive path 16 and ring interface 18. The information from the token ring is received in the form of frames which are managed within the adapter system 10. The lowest levels of data management are accomplished by the protocol handler 20. The protocol handler uses an automatic linked list frame buffer management scheme where buffers are linked by a sixteen bit address field. Additionally, the protocol handler 20 performs hardware based protocol functions for a token ring local area network compatible with the IEEE 802.5 standard. The ring interface 18 contains the digital and analog circuitry necessary to connect the adapter 10 to a token ring local area network through the separate receive path 16 and transmit path 14.

The protocol handler 20 interacts with the system interface 30 and the adapter bus 26. The system interface 30 provides up to forty megabits per second of data to the host system via direct memory access bus master transfers. The system interface 30 has a twenty-four bit address reach into the host system and a scatter write gather read direct memory access feature that allows discontiguous memory blocks to be transferred and received via linked list. The system interface 30 communicates with the communications processor 28 through the adapter bus 26.

The communications processor 28 contains a dedicated sixteen bit central processing unit. The communications processor 28 executes the adapter software necessary for the operation of adapter 10. According to the teachings of the present invention, the address reach of the communication processor 28 is extended by allowing blocks of its sixteen bit address space to be mapped anywhere in a twenty bit or two megabyte address space, and by separating the code and data spaces of the communications processor 28. This memory remapping is accomplished by map registers 36 which are resident in memory interface 32. Only accesses by communications processor 28 into external memory 38 are remapped by memory interface 32 to allow for the extension of the sixteen bit address space into a twenty bit address space, corresponding to two megabytes of usable memory.

The protocol handler 20 uses an automatic linked list frame buffer management scheme, where buffers are linked by a sixteen bit address field. Rather than changing the buffer format to create a twenty bit link address, the sixteen bit link is retained but used as a one kilobyte page number. This "page" addressing capability of the protocol handler 20 is implemented through the use of page address register 24.

The address reach of the system interface 30 is extended by providing an address extension register which overlaps the existing sixteen bit register in such a way that absolute or one kilobyte page addresses may be written. This extension of the existing address registers is implemented in address register 34 resident in system interface 30.

Accordingly, an adapter system 10, which is internally based on a sixteen bit address base, is extended to allow for the access of two megabytes of external memory. The additional memory space allows for a deeper pipeline to allow for more frame throughput and accordingly increased performance in the data communications system.

While the adapter bus 26 is a twenty bit bus allowing for access to two megabytes of DRAMs storage in external memory 38, the architecture of the communications processor 28 remains a sixteen bit address space. Accordingly, the code and data spaces of the communications processor architecture are limited to sixty-four kilobytes each. The communications processor 28 can access sixty-four kilobytes of both code and data by the addition of a Code/Data select line.

In order to allow the communications processor 28 to access the remainder of the twenty bit address space existing in external memory 38, a system of memory "windowing" is employed which allows the communications processor 28 to access different areas of the twenty bit address space by remapping blocks of its code and data spaces.

Figure 2:
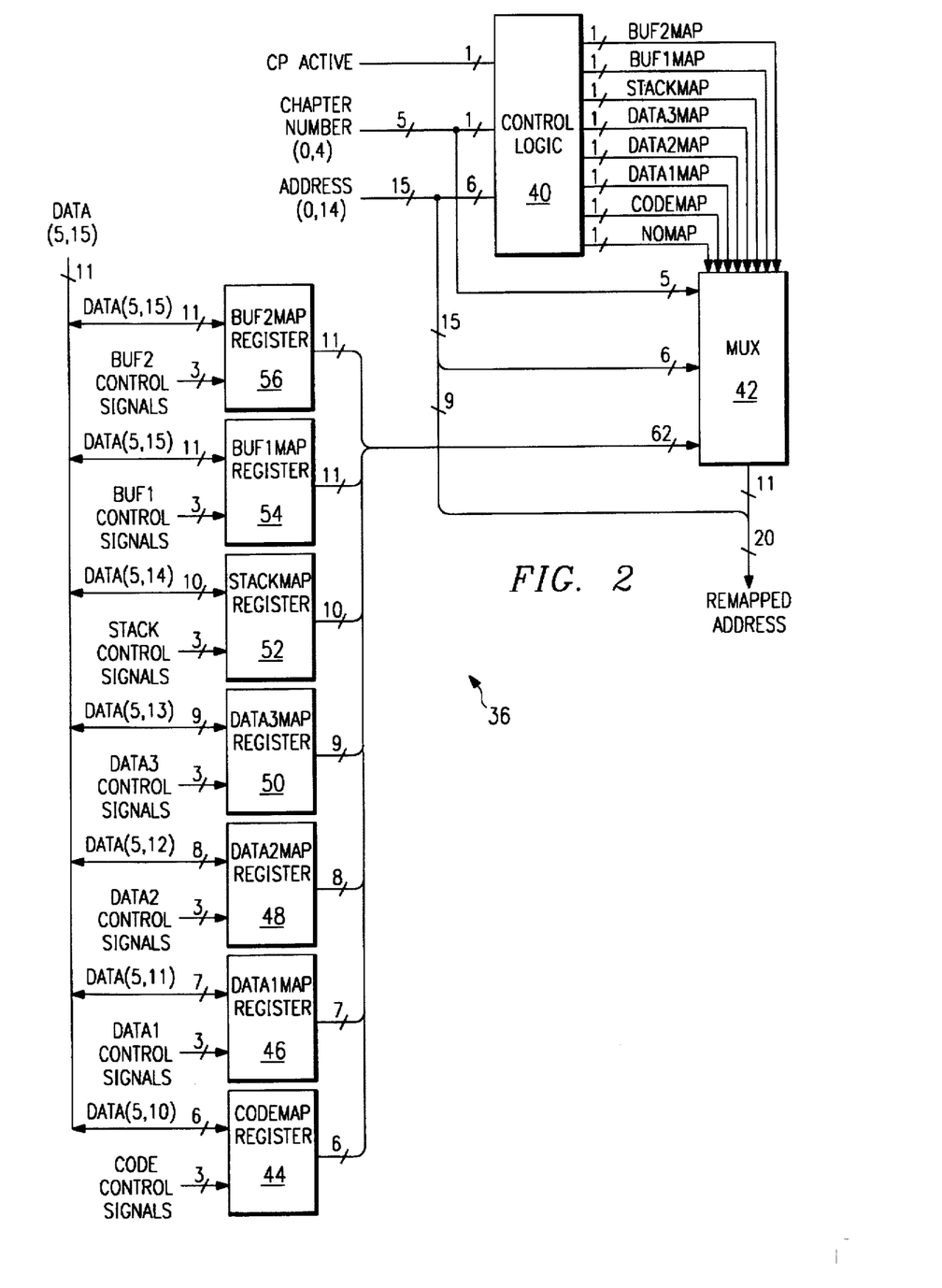
FIG. 2 is a schematic diagram illustrating the memory remapping system used in conjunction with the teachings of the present invention.

Referring now to FIG. 2, a schematic diagram is shown which illustrates the implementation of the map registers 36 resident in memory interface 32. Referring to FIG. 2, a control logic circuit 40 is shown having a CP_ACTIVE signal at one of its inputs. Additionally, the control logic circuit 40 has the least significant bit of the five bit "Chapter Number" bus at one of its inputs and the six most significant bits of the sixteen bit address bus at six of its inputs. The control logic circuit 40 takes the aforementioned signals and generates eight control signals which are used to drive a multiplexer 42. The eight control signals are the BUF2MAP signal, the BUF1MAP signal, the STACKMAP signal, the DATA3MAP signal, the DATA2MAP signal, the DATA1MAP signal, the CODEMAP signal and the NOMAP signal. It should be understood that the fifteen bits of the ADDRESS bus comprise the sixteen least significant bits of the addressing signals omitting the least significant bit. The least significant bit is omitted in the particular embodiment illustrated in FIG. 2 as the communications processor 28 does not have the capability to perform direct byte addressing, but rather uses a read modify write function to write to a specific byte location. The Chapter Number signals (also referred to as the CHAPNUM signals) comprise five address signals which are added to the most significant end of the ADDRESS signals to complete the twenty bit address. The least significant bit of the chapter number comprises the code/data select line when the bus is used by the communications processor 28, which was discussed previously. As will be discussed herein, only this least significant bit of the chapter number bus is required to generate the control signals output by control logic 40.

The six most significant bits of the ADDRESS signals are input into the multiplexer 42. The nine remaining least significant bits of the ADDRESS signals are joined by eleven bits output by the multiplexer to form the twenty bit Remapped Address. The nine ADDRESS bits form the nine least significant bits of the twenty bit Remapped Address, while the eleven bits output by the multiplexer 42 form the eleven most significant bits of the twenty bit Remapped Address.

Bits five through fifteen of the DATA bus coupled to the communications processor 28 are coupled in parallel to the input of seven map registers 44 through 56. Bits five through ten of the data bus are coupled to the inputs of a code map register 44. Additionally, three Code Control signals are input into code map register 44. Code map register 44 outputs six signals to the inputs of multiplexer 42. Code map register 44 comprises six parallel readable and writeable latch circuits, each having the ability to read a single data bit from the data bus responsive to a Read Control signal. Additionally, each of the six latch circuits comprising code map register 44 has the ability to write a stored data bit to the data bus responsive to a Write Control signal. The third control signal input into code map register 44 in addition to the read and write control signals is a reset signal. A variety of digital circuits are known in the art which can accomplish the aforementioned functionality of the latch circuits comprising code map registers 44. Hence, a specific embodiment of the latch circuits will not be described herein.

In operation, code map register 44 receives six data bits from bits number five through ten of the DATA bus and stores them. When the data bits are stored in code map register 44, they appear at the inputs of the multiplexer 42 in a static fashion. As will be described more complete herein, the six data bits stored in the code map register will form a prefix of the remapped address when the CODEMAP signal generated by control logic 40 selects these data bits on the inputs of multiplexer 42. In this manner, the communications processor 28 can load a selected prefix into the code map register 44 off the data bus. This prefix will then be appended onto the remaining least significant fourteen bits of an address sent on the ADDRESS lines. In this manner, a sixteen bit address can be remapped to any selected location in a twenty bit or two megabyte address space.

A first data map register 46 operates similarly to code map register 44. First data map register 46 is coupled to bit numbers five through eleven of the DATA bus. First data map register 46 is also coupled to a read control signal, a write control signal and a reset signal. First data map register 46 outputs seven bits which are coupled to the inputs of the multiplexer 42. Similarly to code map register 44, first data map register 46 comprises seven parallel latches having similar characteristics to the latches comprising code map register 44. First data map register 46 is capable of reading a seven bit value from the DATA bus or writing a seven bit value to the data bus responsive to the read and write control signals, respectively. Once a seven bit value has been stored in first data map register 46, it appears on the inputs of multiplexer 42 and may be selected by the DATA1MAP signal generated by control logic circuit 40. The numbers stored in first data map register 46 will comprise, if selected, the seven most significant bits of the twenty bit remapped address generated by multiplexer 42. The circuitry associated with first data map register 46, as with all the map registers 44 through 56, is static in nature and, as such, requires no clock signals to pass on the data values stored in first data map register 46 to multiplexer 42.

A second data map register 48 operates in a similar manner to first data map register 46 and code map register 44. Second data map register 48 receives eight bits from bit numbers five through twelve of the DATA bus and stores them in eight parallel latch circuits identical to the latch circuits comprising first data map register 46 and code map register 44. Second data map register 48 is operable to write an eight bit value stored in its eight registers to bit numbers five through twelve of the DATA bus. Second data map register 48 reads and writes the eight data bits to the DATA bus responsive to a read and write control signal. Second data map register is also coupled to a reset signal. Second data map register 48 outputs in a static fashion eight data bits stored in its eight registers to the inputs of multiplexer 42. Accordingly, second data map register 48 is operable to supply an eight bit value which may be appended to twelve bits of lesser significance to form a twenty bit Remapped Address if the DATA2MAP signal generated by control logic 40 selects these eight bits within the circuitry of multiplexer 42.

A third data map register 40 is coupled to bit numbers five through thirteen of the DATA bus in a similar manner to the map registers discussed previously. Third data map register is also coupled to a read signal, a write signal and a reset signal. Third data map register 50 outputs a nine bit value to the inputs of multiplexer 42 in a static fashion. Third data map register 50 is also capable of writing a nine bit value stored in its nine parallel latch circuits to bit numbers five through thirteen of the DATA bus.

A stack map register 52 operates in a similar manner to the prior map registers described. Stack map register 52 is coupled to bit numbers five through fourteen of the DATA bus and outputs a ten bit value to the inputs of multiplexer 42. Stack map register 52 is also coupled to a reset signal, a write signal and a read signal. Stack map register 52 is also capable of writing a ten bit value stored in its parallel latch circuits to bits five through fourteen of the DATA bus.

A first buffer map register 54 and a second buffer map register 56 operate identically to the previous map registers described. First and second buffer map registers 54 and 56 each store an eleven bit value and are coupled to bits five through fifteen of the DATA bus. First and second buffer map register 54 and 56 each supply an eleven bit value to the inputs of multiplexer 42. These bit values are supplied in a static fashion and are always present at the inputs of multiplexer 42 after they have been stored in the eleven latch circuits comprising first and second buffer map registers 54 and 56. These eleven bit values are selected respectively by the BUF1MAP signal and the BUF2MAP signal generated by control logic circuit 40.

Figure 3:
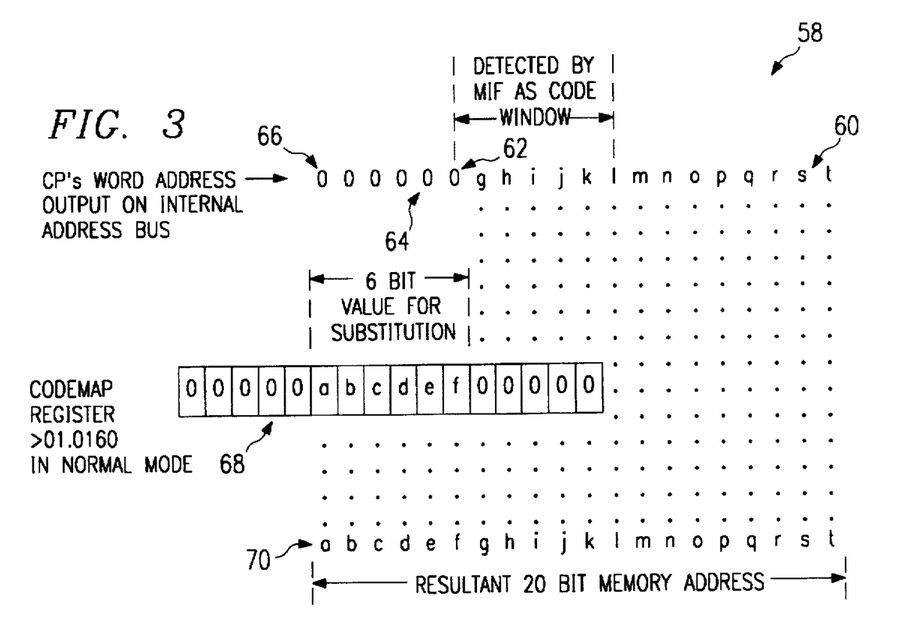
FIG. 3 is a diagram illustrating the memory remapping function of the memory management system used in conjunction with the teachings of the present invention.

FIG. 3 illustrates a diagram indicated generally at 58 which illustrates the memory remapping function performed by the map register circuit 36. Referring to diagram 58, a group of letters g through t, indicated generally at 60, correspond to the ADDRESS bits one through fourteen output by communication processor 28 on adapter bus 26. A single ADDRESS bit, indicated generally at 62, corresponds to the most significant address bit output by the communications processor 28. An adjacent ADDRESS bit, indicated generally at 64, corresponds to the Code/Data select bit which is output by the communications processor 28 onto adapter bus 26. The four address bits to the left of bit 64, indicated generally at 66, together with bit 64, correspond to the five bit chapter Number which is present on the adapter bus 26. The communications processor 28 does not have the capability to affect the values of four bits indicated generally at 66, as the communications processor is only a sixteen bit device. Therefore, the four bits indicated at sixty-six will always have a logical value of zero when the communications processor 28 controls the bus 26. However, the memory interface 32 detects the nineteen bits shown in the top row of the diagram 58. The control logic circuit 40 utilizes bit 64, bit 62 and bits g through k to generate the eight control signals input into multiplexer 42. FIG. 3 illustrates the process by which the code map register 44 is selected and the value stored in code map register 44 is used to form the twenty bit remapped address. If the control logic circuit 40 detects the presence of six zeroes in bits 62 and g through k, and the communications processor 28 has control of bus 26 indicated by a logic level of one on the CP_ACTIVE signal, the CODEMAP signal is output by control logic circuit 40 as an active signal. In this manner, the multiplexer 42 will select the six bits input from the code map register 44 and place them on the six most significant bits of the eleven bits output by the multiplexer 42. The remaining five bits output by the multiplexer 42 will be bits ten through fourteen of the ADDRESS signal. These eleven bits are then output by multiplexer 42 and together with the nine remaining bits of the ADDRESS signals, a twenty bit Remapped Address is formed. Accordingly, although the communications processor 28 is limited by its architecture to generating a sixteen bit address which can only access 128 kilobytes of memory split into two sixty-four kilobyte "chapters", provision is made to allow the communications processor 28 to indirectly access a full two megabytes of address space or 32 sixty-four kilobyte chapters.

The first of the sixty-four kilobyte chapters directly addressable by communications processor 28 is addressed during code fetches and the other of the directly addressable sixty-four kilobyte chapters is addressed during data reads or writes. The address remapping function is accomplished by remapping specific address range within chapter zero, referred to as the code window, and six separate address ranges within chapter one; comprising three data windows and two buffer windows. When a memory access is performed in an address within one of the windows, a selected number of the most significant bits output by the communications processor 28 are substituted by the memory interface 32 with the same number of bits stored in the map registers 36 to create a new twenty bit remapped address; the least significant bits being provided by the communications processor 28 and the most significant bits being provided by one of the selected map registers 44 through 56. The twenty bit remapped address is then used to perform the memory access.

The map registers 44 through 56 are used to store the most significant bits of address used in the address remapping function. When memory accesses are directed to addresses other than those set aside for one of the particular mapping windows, the address is not altered by the memory interface 32 but is used directly for the memory access. In this case, the control logic circuit 40 activates the NOMAP signal which instructs the multiplexer to pass the address output directly to its output. In the case of such a memory access by communications processor 28, the four most significant bits of the address will always be zero. In this manner, the communications processor 28 has the ability to directly access chapter zero and chapter one of the full two megabyte address space. Further, the system's interface 30 and the protocol handler 20 have the ability to directly access the external memory 38 by using their twenty bit address capabilities.

Accesses by either system interface 30 or protocol handler 20 also pass through the multiplexer 42 with the NOMAP signal activated. Memory accesses by the protocol handler 20 and the system interface 30 are provided for through the inclusion of the CP_ACTIVE signal input into control logic circuit 40. The memory remapping system will only replace the most significant bits of the address input into the memory interface 32 when the communications processor 28 is active. The CP_ACTIVE signal will be active when the communications processor 28 is attempting to access the external memory 38. If the CP_ACTIVE signal is not active, the NOMAP signal will be active, allowing for direct access by the protocol handler 20 and the system interface 30 to the external memory 38.

The operation of the map registers 44 through 56 in implementing the aforementioned code window and six data windows is as follows. The code window is designated as a thirty-two kilobyte block of memory between addresses 000000 and 007FFF. When the communications processor performs a code fetch within this range, the memory interface 32 recognizes this occurrence and will substitute the six most significant bits of the address output by the communications processor 28 with six bits from the CODEMAP register 44. The code map register 44 is a sixteen bit register existing in the memory interface 32 at the address 010160. The six least significant bits used in the address translation are contained in bits five to ten of this register. The complete code map register 44 is shown in FIG. 3, indicated generally at 68, with the six bits used in the translation function labelled a through f. The complete remapped twenty bit memory address is shown indicated generally at 70 in FIG. 3 as a through t. The code map register 44 will return the value written to bits five to ten of its register when it is read. The other bits will always read as zero and writing to them has no effect. The code map register will be set to 00000 by reset so that the address translation function will have no effect on the resultant address until the value stored in code map register 44 is changed.

Accordingly, by using the code map register 44, a user of the data communications system of the present invention can subdivide two megabytes of usable memory into 64 thirty-two kilobyte blocks. The memory interface 32 working in conjunction with the communications processor 28 allows the system of the present invention to remap thirty-two kilobytes of code at one time. Thirty-two kilobytes blocks of memory can be accessed by changing the value stored in code map register 44.

The remaining map registers 36 through 56 operate in similar manner to the code map register 44. The first data window is designated as a sixteen kilobyte range of addresses from 018000H and 01BFFFH (a capital "H" following a value being used herein to signify a hexidecimal value). When the communications processor 28 performs a data transfer within this address range, the memory interface 32 recognizes this occurrence and will substitute the seven most significant bits of the address output by the communications processor 28 with the seven bits stored in the first data map register 46. This selection occurs by control logic circuit 40 decoding the CP_ACTIVE input and the ADDRESS signals and the least significant bit of the Chapter Number to activate the DATA1MAP signal. Responsive to the DATA1MAP signal, the multiplexer 42 will select the value stored in the first data map register 46 to output on the seven most significant bits of its output. The first data map register 46 is a sixteen bit register existing in the memory interface 32 at the address 010162H. The seven bits used in the address translation are contained in bits five to eleven in this register. The first data map register 46 will return the value written to bits five to eleven of the register when it is read. The other bits will always read as zero and writing to them has no effect. The first data map register 46 will be set to 0060H by reset so that the address reset function will have no effect on the resultant address until the value stored in first data map register 46 is changed. Accordingly, through the use of first data map register 46, a user of the data communications system of the present invention can subdivide the two megabytes of addressable memory to 128 sixteen kilobyte windows.

The second data map window is designated as an eight kilobyte range of addresses between 01C000H and 01DFFFH. When the communications processor 28 performs a data transfer within this range, the memory interface 32 recognizes this occurrence and will substitute the eight most significant of the address output by the communications processor 28 with eight bits stored in the second data map register 48. This substitution occurs by control logic circuit 40 activating the DATA2MAP signal instructing the multiplexer 42 to select the value input from the second data map register 48. The second data map register 48 is a sixteen bit register existing in the memory interface 32 at address 010164H. The eight bits used in the address translation are contained in bits five through twelve of this register. The resultant twenty bit address is then output on the memory bus for the data transfer to or from external memory 38. The second data map register 48 will return the value written to bits five to twelve of the register when it is read. The other bits will always read as zero and writing to them has no effect. The second data map register will be set to 0070H by the reset signal so that the address translation function will have no effect on the resultant address until the value stored in the second data map register 48 is changed. Through the use of the second data map register 48, a user of the communications system of the present invention has the ability to subdivide the two megabytes of the external memory 38 into 256 eight kilobyte windows.

The third data window is designated as a four kilobyte range of addresses between 01E000H and 01EFFFH. When the communications processor 28 performs a data transfer within this address range, the memory interface 32 recognizes this occurrence and will substitute the nine most significant bits of the address output by the communications processor with nine bits from the third data map register 50. This substitution occurs by control logic circuit 40 activating the DATA3MAP signal instructing the multiplexer 42 to select the value input from the third data map register 50. The third data map register 50 is a sixteen bit register existing in the memory interface 32 at address 010166H. The nine bits used in the address translation function are contained in bits five through thirteen of this register. The third data map register 50 will return the value written to bits five to thirteen of the register when it is read. The other bits will always read as zero and writing to them will have no effect. The third data register map 50 will be set to 0078H by reset so that the address translation function will have no effect upon the resultant address until the value stored in the third data map register 50 is changed. Through the use of the third data map register 50, the user of the data communications system of the present invention can subdivide the external memory 38 into 512 four kilobyte blocks of memory.

The stack window is designated as a two kilobyte range of addresses between 01F000H and 01F7FFH. When the communications processor 28 performs a data transfer within this range, the memory interface 32 recognizes this occurrence and will substitute the ten most significant bits of the address output by the communications processor 28 with ten bits from the stack map register 52. This substitution occurs by control logic circuit 40 activating the STACK-MAP signal instructing the multiplexer 42 to select the value input from the stack map register 52. The stack map register 52 is a sixteen bit register existing in the memory interface 32 at address 010168H. The ten bits used in the address translation function are contained in bits five to fourteen of this register. The stack map register 52 will return the value written to bits five to fourteen of the register when it is read. The other bits will always read as zero and writing to them has no effect. The stack map register 52 will be set to 007CH by reset so that the address translation will have no effect on the resultant address until the value stored in stack map register 52 is changed. Through the use of the stack map register 52, a user of the data communications system of the present invention can subdivide the two kilobytes of addressable memory space in external memory 38 into two kilobyte windows.

The first and second buffer windows are designated each as one kilobyte range of addresses. The first buffer window is designated between the addresses 01F800H and 01FBFFH. The second buffer window is designated between the addresses 01FC00H and 01FFFFH. When the communications processor 28 performs a data transfer within either of these address ranges, the memory interface 32 will recognize this occurrence and will substitute the eleven most significant bits of the address output by the communications processor 28 with eleven bits from either the first buffer map register 54 or the second buffer map register 56. Either of these address values is selected by control logic circuit 40 which activates either the BUF1MAP signal or the BUF2MAP signal instructing multiplexer 42 to select the value stored in the first buffer map register 54 or the second buffer map register 56, respectively. The first buffer map register 54 is a sixteen bit register existing in the memory interface 32 at address 01016AH. The eleven bits used in the address translation are contained in bits five to fifteen of this register. The second buffer map register 56 is a sixteen bit register existing in the memory interface 32 at address 01016CH. The eleven bits used in the address translation are contained in bits five to fifteen of this register as well. Both the first and second buffer map register 54 and 56 will return the value written to bits five to fifteen of the respective register when they are read. The other bits will always read as zero and writing to them has no effect. The first buffer map register 54 will be set to 007EH by reset and the second buffer map register 56 will be set to 007FH by reset so that the address translation function will have no effect upon the resultant addresses until the values stored in either first buffer map register 54 or second buffer map register 56 are changed.

As discussed previously, the memory remapping function is only available for use by the communications processor 28. The remapping functions are not available for use by the system interface 30, the protocol handler 20 or any external bus master. When any of these devices accesses an address within the range of a window, the address will not be translated, but passed directly on to the external memory 38.

The communications processor 28 is configured such that the data and buffer map windows are located in the top thirty-two kilobytes of directly addressable memory space. The interrupt vectors and the adapter registers are located in the lower thirty-two kilobytes of data space. This configuration allows a simple but effective protection scheme to be implemented. In an unrestricted or supervisor mode, the whole of the data space is accessible but in a restricted user mode, data space accesses are restricted to the top thirty-two kilobytes of data space. This is easily achieved by logically "ORing" the most significant address line with a "user" signal. This results in all data windows being available to the user while restricting adapter control registers and interrupt vectors to a privileged "supervisor" mode of operation. User code must return control to supervisor code in order to change map registers, and supervisor mode can check and limit such requests.

Similarly, the code window accessible through CODEMAP register 44 covers the whole of the lower thirty-two kilobytes of directly addressable memory space. This allows a simple code memory management scheme to be used for user programs. In user mode, programs are run only in this lower thirty-two kilobyte region and any accesses to the higher region are considered to be illegal memory accesses and a system fault interrupt is raised. Accordingly, through the use of the memory windowing system of the present invention, user code and supervisory code can coexist in an efficient manner.

Several important technical advantages of the present invention are readily apparent at this stage. The first technical advantage of the memory management scheme of the present invention is that the use of the varying sizes of memory windows allows for efficient memory management techniques to be implemented. A memory management supervisor routine running in communications processor 28 can allocate to a particular user a variety of size windows depending upon that user's needs. Further, because of the large number of windows available to the user, more complex routines can be implemented by the user more efficiently. For example, a user can access numerous blocks of data without having to take the time in his routine to remap his access windows.

A further technical advantage of the memory management scheme of the present invention is that the circuitry used to implement the memory map registers 36 are static devices. Consequently, the memory remapping does not require any clock cycles once the desired values are stored in the map registers 44 through 56. Prior methods of memory remapping often required table lookups and corresponding clock cycles to remap addresses. This is not the case with the memory management circuits used in the present invention. Once the supervisory code has run a remapping routine to set the values stored in the map registers 44 through 56, a user of the system can directly access thirty-two kilobytes of data and thirty-two kilobytes of code space without interference from any memory remapping routines. This results in a much faster and efficient memory remapping scheme. Accordingly, the use of varying sizes of map registers and the implementation of these registers to enable static memory remapping allows for the access of two megabytes of external memory by a communications processor 28 which is internally configured to a sixteen bit address space.

It is a further important technical advantage of the data communications system of the present invention that each of the constituent components has the capability to communicate "page addresses" to each of the other constituent components. A page address is defined herein as an address prefix which defines a single kilobyte section of addressable memory. For example, both the first and second buffer map registers 54 and 56 defined one kilobyte windows through which external memory 38 may be accessed. Each of these one kilobyte windows constitute a "page" of external memory. Accordingly, the communications processor 28, through the use of the first and second buffer map registers 54 and 56 can define the page of memory at which a memory access will occur and the "offset" within the page can be defined on the lower significant bits of the twenty bit remapped address. It should be understood that the choice of a one kilobyte page size is a design choice of the particular embodiment chosen for the purposes of teaching important technical advantages of the present invention. It will be apparent to those skilled in the art that variations in the page size or other parameters disclosed herein such as the internal addressing capability of communications processor 28 or the size of external memory 38 may be altered without departing from the spirit and scope of the present invention.

The system interface 30 also has the capability to address external memory 38 through a page number and an offset. However, system interface 30 also requires the ability to directly access arbitrary addresses during DMA operations between the host system bus 12 and external memory 38. In order to provide system interface 30 with this dual addressing capability, a register circuit is provided which allows for either addressing of a page number with an offset or addressing of an arbitrary address through the writing of a chapter number and then an offset within the chapter. As discussed previously, a chapter is defined for the purposes of teaching the present invention as a single sixty-four kilobyte section of memory defined by the five most significant bits of a twenty bit address.

Figure 4:
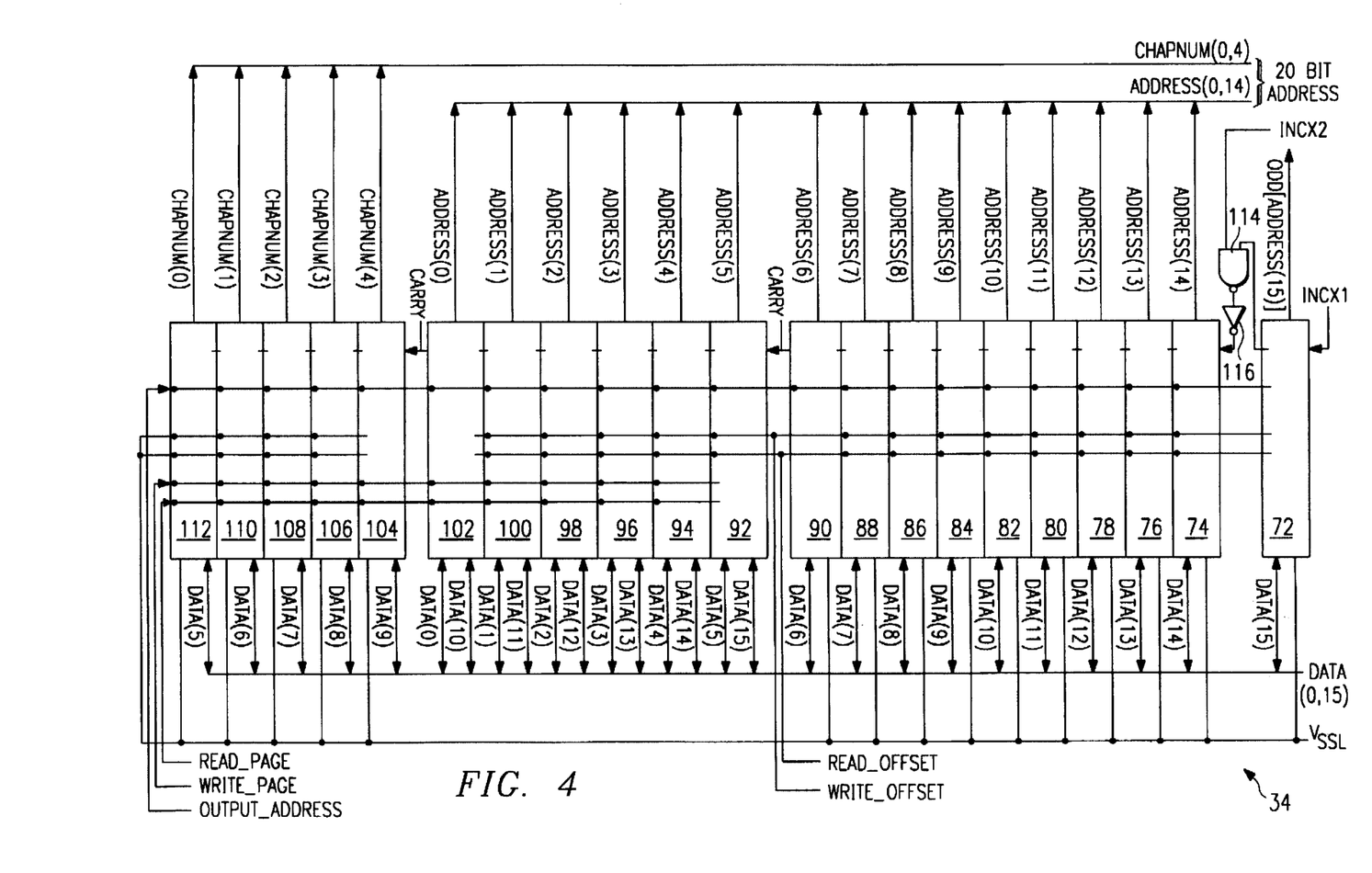
FIG. 4 is a schematic diagram of an address register system used in the system interface of the data communications system of the present invention.

Referring to FIG. 4, a schematic diagram of the address register 34 is shown which is resident in system interface 30. Register circuit 34 comprises the parallel connection of twenty-one latches 72 through 112. Each of latches 72 through 112 comprises a storage circuit having the capability to store a single data bit. Each of the latches 72 through 112 has the capability to receive a data bit to be stored from either of two inputs. Additionally, each of the latches 72 through 112 has the ability to write a stored data bit back on the DATA bus through either of these two inputs. Each of the latches 72 through 112 will output the stored data bit on to an address bus Additionally, each of the latches 72 through 112 comprise a half adder which enables the register circuit 34 to have a carry path flowing from latch 72 through 112. This carry path enables the address stored in register circuit 34 to be incremented by one if an INCX1 signal is input into latch 72. Further, the address stored in register circuit 34 may be incremented by two if an INCX2 signal is input into latch 74 through a NAND gate 114 and an inverter 116. There are a variety of logic designs which will implement the features described above with respect to latches 72 through 112. These implementations are well known to those skilled in the art and therefore a specific implementation will not be described herein.

Latch 72 has a first input coupled to the bit number fifteen of the DATA bus. Its second input is coupled to the VSSL signal. The VSSL signal corresponds to the logic level zero. Accordingly, latch 72 has one of its inputs permanently coupled to logic level zero. Latch 72 will read a data bit from bit number fifteen on the DATA bus responsive to a WRITE_OFFSET signal. Latch 72 will write the bit stored to bit number fifteen on the DATA bus responsive to a READ_OFFSET signal. Latch 72 will output a stored data bit as an ODD signal responsive to an OUTPUT_ADDRESS signal. The ODD signal comprises the fifteenth or least significant bit of the ADDRESS signals and is used to indicate that an odd byte has been addressed. In general, the data communications system of the present invention does not do byte addressing but rather performs a read modify write function to access specific odd bytes. Accordingly, the ODD signal is used by the systems interface 34 to signal the necessity of a read modify write cycle.

The latch 72 outputs a carry signal to one input of NAND gate 114. As discussed previously, latch 72 comprises a half adder such that if the data value stored in latch 72 is a one and the INCX1 signal is active, the carry-out path coupled to the input of NAND gate 114 will also be active.

Latch 74 is identical in construction to latch 72 and has one of its inputs coupled to bit number fourteen of the DATA bus. The second input is coupled to the VSSL signal. Latch 74 is operable to output a single bit to bit number fourteen of the ADDRESS bus responsive to the OUTPUT$_{13}$ ADDRESS signal. Latches 76 through 90 are identical in construction and similarly coupled as latches 72 and 74. Latch 76 is coupled to bit thirteen of the DATA bus and outputs bit thirteen of the ADDRESS bus responsive to the OUTPUT_ADDRESS signal. Latch 78 has one of its inputs coupled to the bit twelve of the DATA bus, the other input coupled to the VSSL signal and outputs bit twelve of the address bus. Latch 80 has one of its inputs coupled to bit eleven of the DATA bus, the second of its inputs coupled to the VSSL signal and outputs bit eleven of the ADDRESS bus. Latch 82 has one of its inputs coupled to bit ten of the DATA bus, its second input coupled to the VSSL signal and outputs bit ten of the ADDRESS bus. Latch 84 has one of its inputs coupled to bit nine of the DATA bus. The second input of latch 84 is coupled to the VSSL signal and outputs bit nine of the ADDRESS bus. Latch 86 has one of its inputs coupled to the bit eight of the DATA bus, the second of its inputs is coupled to the VSSL signal and outputs the bit eight of the ADDRESS bus. Latch 88 has one of its inputs coupled to bit seven of the DATA bus, its second input is coupled to the VSSL signal and outputs bit seven of the ADDRESS bus. Latch 90 has one of its inputs coupled to the bit six of the DATA bus. Its second input is coupled to the VSSL signal and it outputs bit six on the ADDRESS bus. Latch 92 has its first input coupled to bit five on the DATA bus and its second input coupled to bit fifteen on the DATA bus. Latch 92 outputs bit five on the ADDRESS bus. Latch 92 is coupled to the READ_OFFSET signal, the WRITE_OFFSET signal and also is coupled to the READ_PAGE signal and the WRITE_PAGE signal. Accordingly, latch 92 will read a single data value from bit five of the DATA bus responsive to the WRITE_OFFSET signal and will write a stored value to bit five of the DATA bus responsive to the READ_OFFSET signal. Additionally, latch 92 will read and store a single data value from bit fifteen of the DATA bus responsive to its WRITE_PAGE signal and will write a stored data value to bit fifteen of the DATA bus responsive to a READ_PAGE signal. As discussed previously with reference to latch 72 through 90, latch 92 will also write the stored value to bit five of the ADDRESS bus responsive to the OUTPUT_ADDRESS signal. Latch 92 is also in the carry path and will increment the value and output an active carry signal to latch 94 according to the known operations of a half adder circuit.

Latch 94 is identical to latch 92 but has its first input coupled to bit four on the DATA bus and its second input coupled to bit fourteen bit on the DATA bus. Latch 94 will output a stored bit to bit four of the ADDRESS bus. Latch 96 has its first input coupled to bit three on the DATA bus and its second input coupled to bit thirteen on the DATA bus. Latch 96 outputs bit three of the ADDRESS bus. Latch 98 has its first input coupled to the bit two of the DATA bus and its second input coupled to the bit twelve of the DATA bus. Latch 98 outputs bit two of the ADDRESS bus. Latch 100 has its first input coupled to bit one of the DATA bus and its second input coupled to bit eleven of the DATA bus. Latch 100 outputs bit one of the DATA bus. Latch 102 has its first input coupled to bit zero of the DATA bus and its second input coupled to bit ten of the DATA bus. Latch 102 has its output coupled to bit zero of the ADDRESS bus.

Latch 104 through 112 are identical in construction to latches 72 through 102. However, latches 104 through 112 have their first inputs coupled to the VSSL signal and, hence, have only one active input per latch cell.

Latch 104 has its first input coupled to the VSSL signal and a second input coupled to bit nine of the DATA bus. Accordingly, latch 104 will read a single data bit from bit nine of the DATA bus responsive to the WRITE_PAGE signal. Further, latch 104 will write a stored data bit to bit nine of the DATA bus responsive to a READ_PAGE signal. Further, latch 104 will output a stored data bit to bit four of the chapter number which is labelled "CHAPNUM" in FIG. 4 responsive to the OUTPUT_ADDRESS signal. Latch 104 is also coupled to the carry path transmitted from latch 102.

Latch 106 is constructed identically to latch 104 and is coupled in a similar manner except that latch 106 has its second input coupled to bit eight of the DATA bus and outputs a stored bit to bit three of the Chapter Number bus. Latch 108 has its second input coupled to bit seven of the DATA bus and outputs a stored bit to bit two of the Chapter Number bus. Latch 110 has its second input coupled to bit six of the DATA bus and outputs a stored bit to bit one of the Chapter Number bus. Latch 112 has its second input coupled to the bit five of the DATA bus and outputs bit zero of the Chapter Number bus. The five bits of the Chapter Number bus and the fifteen bits of the ADDRESS bus constitute the twenty bit address which is coupled to the adapter bus 26. The ODD signal which constitutes bit sixteen of the ADDRESS bus is used by the systems interface 34 to indicate byte addressing and the necessity for a read modify write cycle.

Each of the latch 72 through 112 is identical in construction and, as such, is operable to receive two read control signals and two write control signals operable to control the transfer of bits through either of its two inputs. For latches 92 through 102, all of these control signals are coupled to active signals as was described previously. As shown in FIG. 4, for latches 72 through 90 and latches 104 through 112, one read control input and one write control input for each latch is disabled by coupling these inputs to the VSSL signal. This is due to the fact that latches 72 through 90 and latches 104 through 112 require only one active input.

In operation, the register circuit 34 can function in one of two different modes. In the first mode, latches 72 through 102 are first loaded with an offset value loaded through the first inputs into each of latches 72 through 102 from bit zero to bit fifteen of the DATA bus. This sixteen bit value is stored respectively in latches 72 through 102. A page number is then written into latches 92 through 112. This page number is written from bit five through bit fifteen of the DATA bus. This second loading of address bits replaces the original six bits which were stored in latches 92 through 102. In this manner, a page number and an offset within the selected page of memory can be output as a twenty bit address by register circuit 34.

In the second mode of operation, an arbitrary address may be written into register circuit 34 by reversing the writing processing discussed previously. In order to write an arbitrary address into register circuit 34, the page number is first written into latches 92 through 112 from bit positions five through fifteen of the DATA bus. Secondly, the offset is written into latches 72 through 102 from bit position zero through fifteen of the DATA bus. This second writing operation replaces the original bits stored in latches 92 through 102. The resulting twenty bit address is thereby a chapter number and an offset within the selected chapter of memory. In this manner, the system interface 30 can perform DMA operations to any arbitrary address or can communicate efficiently with the communications processor 28 and the protocol handler 20 on a page number basis.

This ability of the system interface 30 to operate as either a DMA channel or in conjunction with the communications processor 28 or the protocol handler 20 on a page basis constitutes an important technical advantage of the data communications system of the present invention. The system interface 30 has a dual role in the operation of the adapter 10 and the communications system of the present invention. It must be able to efficiently perform DMA operations from the host system bus 12. However, the system interface 30 must also be able to efficiently access a page addressed by the communications processor 28 or the protocol handler 20. For example, if a page number were stored in one of the buffer map registers 54 or 56, the system interface 30 could retrieve the page number from either of these registers and write it to latches 92 through 112 after first writing the offset to latches 72 through 102. In this manner, the system interface 30 can communicate on a page basis with either the communications processor 28 or the protocol handler 20.

The protocol handler 20 differs from the system interface 30 in that it is not required to perform DMA operations for the host system bus 12. The protocol handler 20 is required to manage communication frames acquired and transmitted on the token ring network through the ring interface 18. These frames, according to the present embodiment of the present invention, are constrained such that they will always be addressed on a page boundary. As discussed previously, a page is defined herein for the purpose of teaching the present invention to comprise a one kilobyte section of memory. Accordingly, the protocol handler 20 need only address the external memory 38 on one kilobyte page boundaries. For this reason, the protocol handler 20 and the page address register 24 contained therein need only address the eleven most significant bits of the twenty bit address placed on adapter bus 26.

Figure 5:
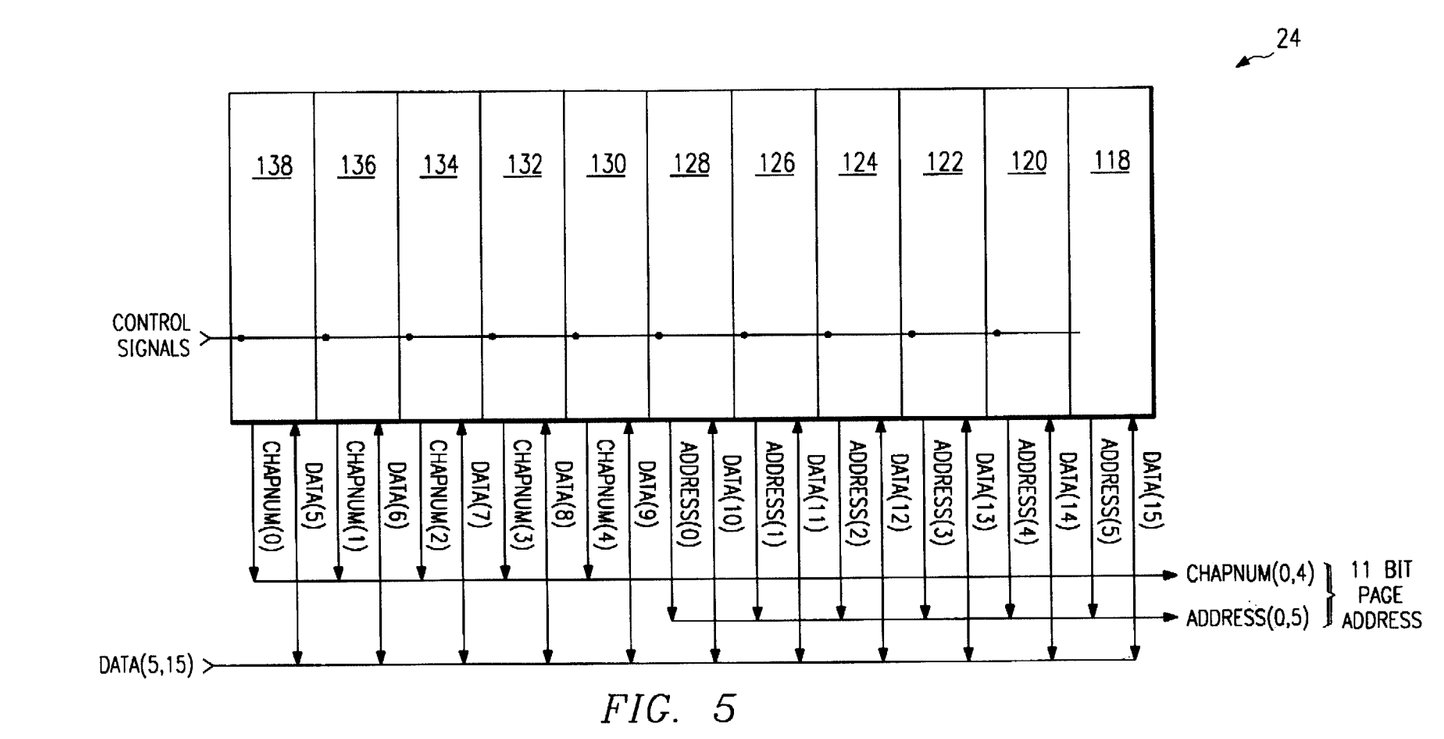
FIG. 5 is a schematic diagram of an address register system used in the protocol handler system of the data communications system of the present invention.

Referring to FIG. 5, a schematic diagram of the page address register 24 is shown. Page address register circuit 24 comprises the parallel connection of eleven latches 118 through 138. Latches 118 and 138 are identical in construction and comprise a readable and writeable memory storage cell. A plurality of control signals are coupled to each of latches 118 through 138. These control signals comprise, for example, a clock signal for the synchronous operation of latch 118 through 138, a reset signal, a WRITE_CONTROL signal and a READ_CONTROL signal operable to respectively instruct the latch to read a value from the allocated bit of the DATA bus or to write a bit stored in the latch to the allocated bit of the DATA bus. Further, an output control signal is coupled to each latch 118 through 138 which instructs the latch to output a stored data value to the address line coupled to its output.

Latch 118 is coupled at its input to bit fifteen of the DATA bus and has its output coupled to the bit five of the ADDRESS bus. Latch 120 has its input coupled to bit fourteen of the DATA bus and its output coupled to bit four of the ADDRESS bus. Latch 122 has its input coupled to bit thirteen of the DATA bus and its output coupled to bit three of the ADDRESS bus. Latch 124 has its input coupled to bit twelve of the DATA bus and its output coupled to bit two of the ADDRESS bus. Latch 126 has its input coupled to bit eleven of the DATA bus and its output coupled to bit one of the ADDRESS bus. Latch 128 has its input coupled to bit ten of the DATA bus and its output coupled to bit zero of the ADDRESS bus. Latch 130 has its input coupled to bit nine of the DATA bus and its output coupled to bit four of the Chapter Number bus (CHAPNUM "4"). Latch 132 has its input coupled to bit 8 of the DATA bus and its output coupled to bit three of the Chapter Number bus. Latch 134 has its input coupled to bit seven of the DATA bus and its output coupled to bit two of the Chapter Number bus. Latch 136 has its input coupled to bit six of the DATA bus and its output coupled to bit one of the Chapter Number bus. Latch 138 has its input coupled to bit five of the DATA bus and its output coupled to bit zero of the Chapter Number bus.

In operation, the protocol handler 20 can write a page address to the latches 118 through 138 from bits five through fifteen of the data bus. This page address can then be used by the protocol handler 20 to access external memory 38. Protocol handler 20 is thus constrained in the disclosed embodiment to memory accesses which occur on one kilobyte page boundaries with the following exceptions. Further circuitry (not shown) within protocol handler 20 allows for the access of memory addresses at a one kilobyte page boundary plus two bytes, plus four bytes or plus six bytes in order to access protocol information in a frame stored in external memory 38. These memory accesses are to allow the protocol handler 20 to access the NEXT field which occurs even on one kilobyte page boundaries. Additionally, the protocol handler 20 may access the length field which is positioned at the one kilobyte page boundary plus two bytes, the STATUS field which is positioned on the one kilobyte page boundaries plus four bytes and the DATA field which is positioned at the one kilobyte page boundaries plus six bytes. The protocol handler 20 achieves this by placing a logic level one on the ADDRESS bus in either the second, third or second and third least significant bits of the twenty bit ADDRESS bus.

In summary, a data communications system has been disclosed which comprises a communications processor 28, a systems interface 30 and a protocol handler 20, all of which comprise circuitry which allow them to efficiently access external memory 38 and efficiently communicate with one another. A memory interface 32 allows for the communications processor 28 to access a full two megabytes of addressable memory space using a sixteen bit internal structure. Memory interface 32 achieves this address extension through the use of map register circuit 36. The map registers 44 through 56 disposed in map register circuit 36 allow for efficient management of the memory space and for the implementation of security routines to prevent user interference with supervisory code and data spaces. The use of one kilobyte buffers in conjunction with the use of eleven bit page addresses allows for the efficient communication of data addressing information between the protocol handler 20, the system interface 30 and the communications processor 28. Additionally, the system interface 30 comprises register circuit 34 which allows for two modes of operation. In the first mode of operation, the system interface 30 can access information using the page number information output by either the protocol handler 20 or the communications processor 28. In the second mode of operation, the system interface 30 can operate as a DMA channel for the host system bus 12 and access arbitrary address locations by first writing a page address and overwriting the least significant portion of the twenty bit address to result in a chapter number and offset value within the selected chapter of memory.

The inclusion of the memory interface 32 in the data communications system of the present invention allows for the implementation of efficient memory managements techniques and security measures. The map register 36 is implemented in such a manner that it does require any clock cycles to perform the remapping functions required in the memory management techniques implemented in the communications system of the present invention. Further, the use of variable size memory windows allows for the efficient allocation responsive to varied user needs.

What is claimed is:

1. A data communications system memory interface circuit, comprising:
   a plurality of register circuits each operable to store one of a plurality of predetermined address prefixes;
   control circuitry responsive to an address signal having a plurality of bits for generating a control signal; and
   multiplexing circuitry responsive to said control signal for combining said address signal with one of said plurality of address prefixes from the respective register circuit in which the said one address prefix is stored to generate a remapped address signal having more bits than said address signal;
   wherein each one of said plurality of address prefixes comprises a different number of significant bits, each one of said plurality of address prefixes defining a window of addressable memory space, the size of each of said windows of addressable memory space inversely related to the number of bits in each of said plurality of address prefixes.

2. A data communications system memory interface circuit, comprising:
   a plurality of register circuits each operable to store one of a plurality of predetermined address prefixes;
   control circuitry responsive to an address signal having a plurality of bits for generating a control signal; and
   multiplexing circuitry responsive to said control signal for combining said address signal with one of said plurality of address prefixes to generate a remapped address signal having more bits than said address signal;
   wherein said multiplexing circuitry generates said remapped address signal independently from a clock signal.

3. A data communications system memory interface circuit, comprising:

a plurality of register circuits each operable to store one of a plurality of predetermined address prefixes;
   control circuitry responsive to an address signal having a plurality of bits for generating a control signal; and
   multiplexing circuitry responsive to said control signal for combining said address signal with one of said plurality of address prefixes to generate a remapped address signal having more bits than said address signal;
   wherein the data communications system further comprises a communications processor, a protocol handler and a systems interface, said communications processor operable to control said protocol handler and system interface, the circuit further comprising:
   one of said plurality of register circuits comprising a buffer map register, responsive to said multiplexing circuitry, operable to store a buffer address prefix defining a page of memory space;
   circuitry associated with the protocol handler for retrieving and storing said buffer address prefix from said one of said register circuits such that the protocol handler may selectively access said page of memory space; and
   circuitry associated with the systems interface for retrieving and storing said buffer address prefix from said selected one of said register circuits such that the systems interface may selectively access said page of memory space;
   wherein said circuitry associated with the systems interface for retrieving and storing said buffer address prefix further comprises:
   a first plurality of latches operable to store a corresponding number of most significant address bits;
   a second plurality of latches operable to store a corresponding number of least significant address bits;
   a third plurality of latches operable to store a corresponding number of address bits of significance between said most and said least significant address bits, each of said third plurality of latches comprising first and second inputs and operable to be selectively loaded from either of said first or second inputs;
   circuitry for first loading said first plurality of latches simultaneously with said third plurality of latches through said first inputs with a selected address prefix defining a page of memory space and subsequently loading said second plurality of latches simultaneously with said third plurality of latches through said second inputs with a selected value such that said third plurality of latches is overwritten and said latches are operable to store an arbitrary address value; and
   circuitry for first loading said second plurality of latches simultaneously with said third plurality of latches through said second inputs with a selected offset value and subsequently loading said first plurality of latches simultaneously with said third plurality of latches through said first inputs with said buffer address prefix such that said third plurality of latches is overwritten and said latches are operable to store said buffer address prefix defining a page of memory space and an offset value defining a selected number of memory locations within said page.

4. A data communications system memory interface circuit, comprising:
   a plurality of register circuits each operable to store one of a plurality of predetermined address prefixes;
   control circuitry responsive to an address signal having a plurality of bits for generating a control signal; and multiplexing circuitry responsive to said control signal for combining said address signal with one of said plurality of address prefixes to generate a remapped address signal having more bits than said address signal;

wherein the data communications system comprises a communications processor, a systems interface, and a protocol handler, said communications processor operable to control said system interface and protocol handler, the memory interface circuit further comprising:

circuitry associated with the systems interface and coupled to said plurality of register circuits for selectively retrieving and storing address prefixes stored in said plurality of register circuits; and circuitry associated with the protocol handler and coupled to said plurality of register circuits for selectively retrieving and storing address prefixes stored in said plurality of register circuits such that said system interface and said protocol handler are operable to address and access external memory.

5. A data communications system, comprising:

a protocol handler circuit operable to be coupled to a local area network;

a systems interface circuit operable to be coupled to a host computer and coupled to said protocol handler circuit;

a communications processor coupled to said protocol handler circuit and said systems interface circuit and operable to generate an address value, a plurality of address prefixes and a processor-active signal indicating a memory access by said communications processor; and a memory interface circuit coupled to said communications processor, said protocol handler circuit and said system interface circuit, said memory interface circuit comprising:

a plurality of register circuits each operable to store one of said plurality of address prefixes;

control circuitry responsive to said address value and said processor-active signal for generating a plurality of control signals each corresponding to one of said plurality of register circuits and for generating an additional control signal;

multiplexing circuitry coupled to said control circuitry and said register circuits, responsive to the receipt of one of said control signals associated with a corresponding register circuit and operable to select an address prefix stored in a corresponding one of said plurality of register circuits, said multiplexing circuitry further operable to generate a remapped address value comprising one or more of said address prefix bits and one or more of said address value bits, said remapped address value having more bits than said address value; and circuitry coupled to said communications processor and said register circuits operable to selectively load said address prefixes into said register circuits.

6. The system of claim 5 wherein said control circuitry in response to the receipt of an address value without the receipt of said processor-active signal, is operable to transmit said additional control signal to said multiplexing circuit, said processor-active signal transmitted by said communications processor to said control circuitry when said communications processor is performing a memory access, said multiplexing circuitry responsive to the receipt of said additional control signal operable to transmit said address value such that only address values generated by said communications processor will result in the generation of a remapped address value.

7. The system of claim 5 wherein each one of said plurality of address prefixes comprises a differing number of significant bits such that each of said plurality of address prefixes defines a window of addressable memory space, the size of said window inversely related to the number of bits in a corresponding one of said plurality of address prefixes.

8. The system of claim 5 wherein said circuits and said circuitries generate said remapped address value independently of clock signals.

9. The system of claim 5 wherein one of said plurality of register circuits comprises a buffer map register circuit operable to store a buffer address prefix, none of the remaining register circuits operable to store a larger number of bits than said buffer map register circuit, said buffer address prefix, when selected by said multiplexing circuitry, defining a page of memory space, the system further comprising:

circuitry associated with the protocol handler circuit for retrieving and storing said buffer address prefix such that the protocol handler circuit may selectively access said page of memory space; and circuitry associated with the systems interface for retrieving and storing said buffer address prefix such that the systems interface may selectively access said page of memory space.

10. The circuitry of claim 9 wherein said circuitry associated with the systems interface circuit for retrieving and storing said buffer address prefix, comprises:

a first plurality of latches operable to store a corresponding number of most significant address bits;

a second plurality of latches operable to store a corresponding number of least significant address bits;

a third plurality of latches operable to store a corresponding number of address bits of significance between said most and said least significant address bits, each of said third plurality of latches comprising first and second inputs and operable to be loaded from either of said first or second inputs;

circuitry for first loading said first plurality of latches simultaneously with said third plurality of latches through said first inputs with a selected address prefix and subsequently loading said second plurality of latches simultaneously with said third plurality of latches through said second inputs with a selected value such that said third plurality of latches is overwritten and said latches are operable to store an arbitrary address value; and circuitry for first loading said second plurality of latches simultaneously with said third plurality of latches through said second inputs with a selected value and subsequently loading said first plurality of latches simultaneously with said third plurality of latches through said first inputs with said buffer address prefix such that said third plurality of latches is overwritten and said latches are operable to store said buffer address prefix defining a page of memory space and an offset value defining a selected number of memory locations within said page.

11. The system of claim 5 and further comprising:

circuitry associated with the systems interface circuit and coupled to said plurality of register circuits for selectively retrieving and storing address prefixes stored in said plurality of register circuits; and circuitry associated with the protocol handler circuit and coupled to said plurality of register circuits for selectively retrieving and storing address prefixes stored in said plurality of register circuits such that said systems interface circuit and said protocol handler circuit are operable to address and access said external memory.

12. The system of claim 5 wherein said remapped address value includes said selected address prefix, the remainder of said remapped address value filled with the least significant bits of said address value, such that the memory interface circuit is operable to access memory space which is greater than a memory space addressable through the use of said address value alone.

13. A data communications system, comprising:
a protocol handler circuit operable to be coupled to a local area network;
a systems interface circuit operable to be coupled to a host computer and coupled to said protocol handler circuit;
a communications processor coupled to said protocol handler circuit and said systems interface circuit;
a memory interface circuit coupled to said communications processor, said systems interface circuit and said protocol handler circuit and operable to be coupled to a memory circuit;
a buffer register circuit coupled to said memory interface circuit operable to store a buffer address prefix defining a selected page of memory locations in the memory circuit;
a first register circuit coupled to said protocol handler circuit operable to store said buffer address prefix such that said protocol handler circuit is operable to access said selected page of memory locations by appending said buffer address prefix to addresses generated by said protocol handler circuit;
a second register circuit coupled to said systems interface circuit operable to store said buffer address prefix such that said systems interface circuit is operable to access said selected page of memory locations by appending said buffer address prefix to addresses generated by said systems interface circuit, such that more memory locations can be addressed than with an address alone.

14. The system of claim 13 and further comprising:
first data communications circuitry coupled to said communications processor and said buffer register circuit for storing a selected value in said buffer register circuit;
second data communications circuitry coupled to said buffer register circuit and said first and second register circuits operable to retrieve said buffer address prefix from said buffer register circuit and store said buffer address prefix selectively in said first and second register circuits.

15. The system of claim 13 wherein said second register circuit comprises:
a first plurality of latches operable to store a number of most significant bits corresponding to the number of said first plurality of latches;
a second plurality of latches operable to store a number of least significant bits corresponding to the number of said second plurality of latches;
a third plurality of latches operable to store a number of bits of significance between said most and said least significant address bits corresponding to the number of said third plurality of latches, said first and third plurality of latches together operable to store said buffer address prefix.

16. The system of claim 15 wherein each of said third plurality of latches comprise first and second inputs and is operable to be loaded from either of said first or second inputs, the system further comprising:
circuitry for first loading said first plurality of latches simultaneously with said third plurality of latches through said first inputs with a selected address prefix defining a page of memory space and subsequently loading said second plurality of latches simultaneously with said third plurality of latches through said second inputs with a selected value such that said third plurality of latches is overwritten and said latches are operable to store an arbitrary address value; and
circuitry for first loading said second plurality of latches simultaneously with said third plurality of latches through said second inputs with a selected offset value and subsequently loading said first plurality of latches simultaneously with said third plurality of latches through said first inputs with said buffer address prefix such that said third plurality of latches is overwritten and said latches are operable to store said buffer address prefix defining a page of memory space and an offset value defining a selected number of memory locations with said page.

17. The system of claim 13 and further comprising:
map register circuitry coupled to said memory interface circuit operable to store a map address prefix having a different number of bits than said buffer address prefix such that said map address prefix defines a section of memory locations in the memory circuit differing in size from said page; and
data communications circuitry coupled to said communications processor and said map register circuitry for storing a selected value in said map register circuitry.

18. A method for accessing a plurality of memory locations, comprising the steps of:
storing a plurality of address prefixes in a corresponding plurality of register circuits, each of said address prefixes comprising at least one address prefix bit, but not all of said address prefixes comprising the same number of bits;
generating a control signal in response to an address value having a plurality of bits and generated by a communications processor accessing one of said plurality of memory locations;
selecting one of the plurality of address prefixes in response to the control signal; and
generating a remapped address value, in response to the control signal, comprising one or more of the address prefix bits and one or more of the address value bits, said remapped address value having more bits than said address value.

19. The method of claim 18 and further comprising the step of selectively loading the address prefixes into the register circuits in response to a second control signal generated by the communications processor.

20. The method of claim 18 and further comprising the step of accessing one of said plurality of memory locations associated with the remapped address value.

21. The method of claim 18 wherein said step of storing comprises the step of storing said plurality of address prefixes each comprising a differing number of bits such that each of the plurality of address prefixes defines a window of addressable memory space, the size of each of the windows of addressable memory space inversely related to the number of bits in each of the plurality of address prefixes.

22. The method of claim 18, wherein generating the control signal occurs in a static manner independently from clock signals.

23. The method of claim 18 wherein said step of selecting comprises the step of selecting said one of the plurality of address prefixes in a static manner such that said step of selecting occurs independently from clock signals.

24. A data communications system memory interface circuit, comprising:

a communications processor, a protocol handler and a systems interface, said communications processor operable to control said protocol handler and systems interface, the circuit further comprising:

a plurality of register circuits each operable to store one of a plurality of predetermined address prefixes;

control circuitry responsive to an address signal having a plurality of bits for generating a control signal;

multiplexing circuitry responsive to said control signal for combining said address signal with one of said plurality of address prefixes from the respective register circuit in which the said one address prefix is stored to generate a remapped address signal having more bits than said address signal;

one of said plurality of register circuits comprising a buffer map register circuit, responsive to said multiplexing circuitry, operable to store a buffer address prefix defining a page of memory space;

circuitry associated with the protocol handler for retrieving and storing said buffer address prefix from said buffer map register circuit such that the protocol handler may selectively access said page of memory space; and circuitry associated with the systems interface for retrieving and storing said buffer address prefix from said buffer map register circuit such that the systems interface may selectively access said page of memory space.

25. A method for accessing a plurality of memory locations, comprising the steps of:

storing a plurality of address prefixes in a corresponding plurality of register circuits, each of said address prefixes comprising at least one address prefix bit, but not all of said address prefixes comprising the same number of bits;

generating a control signal in response to an address value having a plurality of bits and generated by a communications processor accessing one of said plurality of memory locations;

selecting one of a plurality of address prefixes in response to the control signal;

generating a remapped address value, in response to the control signal, comprising one or more of the address prefix bits and one or more of the address value bits, said remapped address value having more bits than said address value;

receiving a processor-active signal from the communications processor; and the step of generating a remapped address value being performed only in response to the receipt of the processor-active signal such that only memory location accesses performed by the communications processor result in the generation of the remapped address value.

26. The method of claim 25 wherein said step of storing comprises the step of storing a buffer address prefix in a buffer map register, the buffer address prefix defining a page of memory space, the method further comprising the steps of:

retrieving the buffer address prefix from the buffer map register;

storing the buffer address prefix in a protocol handler circuit coupled to the communications processor such that the protocol handler circuit may selectively access the page of memory space; and storing the buffer address prefix in a systems interface circuit coupled to the communications processor and the protocol handler circuit such that the systems interface circuit may selectively access the page of memory space.

* * * * *